(12) United States Patent
Bonn

(10) Patent No.: US 6,533,334 B1
(45) Date of Patent: Mar. 18, 2003

(54) VACUUM-JACKETED BAYONET PIPE SPOOL AND PIPE SPOOL SYSTEM FOR CRYOGENIC FLUID

(75) Inventor: John W. Bonn, Hilliard, OH (US)

(73) Assignee: Chart Inc., Mayfield Heights, OH (US)

( * ) Notice: Subject to any disclaimer, the term of this patent is extended or adjusted under 35 U.S.C. 154(b) by 0 days.

(21) Appl. No.: 09/701,141

(22) PCT Filed: Oct. 13, 2000

(86) PCT No.: PCT/US00/28303

§ 371 (c)(1),
(2), (4) Date: Nov. 22, 2000

(87) PCT Pub. No.: WO01/27514

PCT Pub. Date: Apr. 19, 2001

Related U.S. Application Data

(60) Provisional application No. 60/159,282, filed on Oct. 13, 1999.

(51) Int. Cl.$^7$ .................................................. F16L 27/00
(52) U.S. Cl. ..................... 285/904; 285/145.5; 285/300
(58) Field of Search ........................... 285/904, 47, 54, 285/299, 145.5, 300, 187

(56) References Cited

U.S. PATENT DOCUMENTS

| 311,178 | A | 1/1885 | Duffy |
|---|---|---|---|
| 1,481,255 | A | 1/1924 | Cumfer |
| 1,786,506 | A | 12/1930 | Ray |
| 1,951,677 | A | 3/1934 | Rösener |
| 1,993,740 | A | 3/1935 | Harris |
| 2,014,355 | A | 9/1935 | Hussman |
| 2,185,450 | A | 1/1940 | Wager |
| 2,196,766 | A | 4/1940 | Hasche |
| 2,337,038 | A | 12/1943 | Fentress |
| 2,348,833 | A | 5/1944 | Miller |
| 2,732,227 | A | 1/1956 | Kaiser |
| 2,937,036 | A | 5/1960 | Watkins |
| 3,053,554 | A | 9/1962 | Magos et al. |
| 3,068,026 | A | 12/1962 | McKamey |
| 3,127,200 | A | 3/1964 | Sayag |
| 3,137,143 | A | 6/1964 | Jacobs et al. |
| 3,207,533 | A | 9/1965 | Van Gundy et al. |
| 3,319,979 | A | 5/1967 | Herold et al. |
| 3,369,829 | A | 2/1968 | Hopkins |
| 3,466,886 | A | 9/1969 | Doose et al. |
| 3,469,862 | A | 9/1969 | Conibeer |
| 3,488,067 | A | 1/1970 | Sommer |
| 3,642,060 | A | 2/1972 | Hlinka |
| 3,725,565 | A | 4/1973 | Schmidt |
| 3,843,171 | A | * 10/1974 | Hewlett ....................... 285/904 |
| 3,876,235 | A | 4/1975 | Flint |
| 3,884,511 | A | * 5/1975 | Hermanson ................. 285/904 |
| 3,885,595 | A | 5/1975 | Gibson et al. |

(List continued on next page.)

FOREIGN PATENT DOCUMENTS

| CA | 683468 | 3/1964 | |
|---|---|---|---|
| DE | 315487 | 3/1918 | |
| DE | 935224 | 11/1955 | |
| DE | 1525447 | 12/1968 | |
| DE | 26 31 566 | 1/1978 | |
| DE | 31 42 702 | 5/1983 | |
| DE | 34 06 607 | 8/1985 | |
| DE | 4031879 | * 4/1992 | ................. 285/904 |
| FR | 2238109 | 2/1975 | |
| GB | 964811 | 7/1964 | |
| GB | 1101074 | 1/1968 | |
| SU | 752109 | 7/1980 | |

*Primary Examiner*—Lynne H. Browne
*Assistant Examiner*—David E. Bochna
(74) *Attorney, Agent, or Firm*—Calfee, Halter & Griswold LLP

(57) ABSTRACT

A vacuum-jacketed bayonet pipe spool system for cryogenic fluid. The pipe spool comprises a male bayonet to fit within a female bayonet of an opposing pipe and an expansion-contraction second bellows about the outer end of the male bayonet for stress-free movement.

12 Claims, 4 Drawing Sheets

U.S. PATENT DOCUMENTS

| | | | |
|---|---|---|---|
| 3,901,539 A | | 8/1975 | Ijzerman |
| 3,991,588 A | * | 11/1976 | Laskaris .................... 285/904 |
| 4,011,732 A | | 3/1977 | Doherty et al. |
| 4,036,617 A | | 7/1977 | Leonard et al. |
| 4,036,618 A | | 7/1977 | Leonard et al. |
| 4,046,407 A | | 9/1977 | Porreco |
| 4,060,263 A | | 11/1977 | Kotcharian |
| 4,099,746 A | * | 7/1978 | Kontsch et al. ............. 285/904 |
| 4,107,946 A | | 8/1978 | Potter |
| 4,108,476 A | * | 8/1978 | Krupp ........................ 285/904 |
| 4,134,449 A | | 1/1979 | La Haye et al. |
| 4,165,107 A | | 8/1979 | Affa et al. |
| 4,207,745 A | * | 6/1980 | Pouillange .................. 285/904 |
| 4,246,959 A | | 1/1981 | Byrne |
| 4,332,401 A | | 6/1982 | Stephenson et al. |
| 4,377,552 A | | 3/1983 | Doublet et al. |
| 4,502,714 A | * | 3/1985 | Brown et al. ............... 285/904 |
| 4,515,397 A | | 5/1985 | Nowobilski et al. |
| 4,576,404 A | | 3/1986 | Weber |
| 4,668,303 A | | 5/1987 | Weber |
| 4,685,703 A | | 8/1987 | Brock |
| 4,838,581 A | | 6/1989 | Oda et al. |
| 5,090,746 A | | 2/1992 | Holzhausen |
| 5,370,427 A | | 12/1994 | Hoelle et al. |
| 5,378,016 A | | 1/1995 | Vollmer et al. |

* cited by examiner

WELDED BAYONET ASSEMBLY

FLANGED BAYONET ASSEMBLY

CLAMPED BAYONET ASSEMBLY

VACUUM-JACKETED BAYONET PIPE SPOOL AND PIPE SPOOL SYSTEM FOR CRYOGENIC FLUID

REFERENCE TO PRIOR APPLICATION

This application incorporates by reference in its entirety and claims the benefit of the filing date of U.S. Provisional Patent Application Serial No. 60/159,282, filed Oct. 13, 1999.

BACKGROUND OF THE INVENTION

Cryogenic fluid piping systems, for example, for transport of liquified natural gas (LNG) or other cryogenic fluids, typically, employ vacuum-jacketed male and female bayonet connectors therein.

U.S. Pat. No. 3,885,595, issued May 27, 1975, shows a conduit for cryogenic fluid transport. Each conduit section has a male and a female end such that the conduit section can be laid end to end with similar conduit sections to form a continuous conduit. Each conduit section has an inner and an outer pipe. The space between the inner and outer pipe is filled with insulation. Both the male end and female end are frusto-conical in shape and telescoped together in use. A thermal motion compensator, i.e., a metal bellows, is secured about the female end of the inner pipe. In the assembled state, the outer pipes of adjacent conduit sections are welded to each other. In the operating state, pressure from the cryogenic fluid flowing inside the inner pipe acts upon the outside of the thermal motion compensator and is contained from the environment by the outer pipe welds. A liquid seal is provided between the male and female ends of the inner pipe.

German Patent No. 315487, issued Jul. 25, 1931, shows an expansion-compensating conduit connection. A male end of a first conduit section is inserted into a female end of a second conduit section. An expansion compensator is located on the male end of the first conduit section.

U.S. Pat. No. 4,515,397, issued May 7, 1985, shows a vacuum-insulated conduit. The conduit comprises an inside pipe and an outside pipe. A plate having a radially solid portion connects the end of the outer pipe to one end of a bellows, which is located around a portion of the inner pipe that extends beyond the end of the outer pipe. The opposite end of the bellows is connected to the outer circumference of the inner pipe. The space between the inside and outside pipe is evacuated to form a vacuum. Other U.S. patents relative to cryogenic systems include U.S. Pat. No. 4,011,732, issued Mar. 15, 1977, and U.S. Pat. No. 4,107,946, issued Aug. 22, 1978.

It is desirable to provide a new, improved, vacuum-jacketed, male-female bayonet connector particularly useful in cryogenic fluid piping systems, such as LNG systems, and which connectors allow for stress-free thermal expansion and contraction and eliminate or reduce the need for expansion loops in the system.

SUMMARY OF THE INVENTION

The invention relates to a male-female bayonet or pipe spool connector with a male bayonet with an expansion bellows and a cryogenic fluid piping system employing the connector.

The invention comprises and is directed to a bellows and male bayonet connection for connecting vacuum-jacketed pipe spool sections to one another. The connection allows stress-free thermal expansion and contraction of the inner pipe within each spool, thus, eliminating or reducing the need for expansion loops. Within an outer pipe is an inner pipe. The inner pipe carries cryogenic fluid at a certain pressure and temperature. The space between the outer pipe and the inner pipe is evacuated to form an insulating vacuum jacket around the inner pipe. The male end of the spool comprises a male bayonet portion and expansion peripheral bellows secured about the exterior of the male bayonet at the open end. The male bayonet portion is attached to a first annular seal between the male bayonet portion and the outer pipe at one end and to the bellows at the other open end. The opposing end of the bellows is attached to a male end of the inner pipe. The spaces between the male bayonet portion and the inner pipe, between the bellows and the inner pipe and between the outer pipe and the inner pipe, communicate with one another and are at the same vacuum pressure.

The female end of the spool comprises a female bayonet portion that is attached to a female end of the inner pipe. The opposing end of the female bayonet portion is attached to a second annular seal between the female bayonet portion and the outer pipe. The spaces between the female bayonet portion and the outer pipe, and between the outer pipe and the inner pipe, communicate with one another and are at the same vacuum pressure. The male and female spool ends connect together by a means to connect, such as a bolted flange connection, a clamped connection, or a welded connection. When a rise or fall in temperature causes the inner pipe to lengthen or shorten, the male end of the inner pipe moves and extends or compresses the surrounding secured bellows. The female end of the inner pipe is fixed to and does not move in relation to the female bayonet portion. The bayonet connection results in a nearly uninterrupted, smooth interior wall of the inner pipe that is conductive to smooth, non-turbulent, cryogenic fluid flow.

The invention comprises a cryogenic fluid piping system with a plurality of two or more coupled first and second pipe spools, the first pipe spool having an outer pipe and a concentric inner pipe to carry cryogenic fluid, the outer pipe and inner pipe forming a vacuum-insulated connection, and a male bayonet at the one end of the first pipe spool having an external, male sealing surface, and having a first open end and other end, and an expansion-contraction peripheral bellows longitudinally about the external surface of the male bayonet adjacent the first open end, and a means to secure the one end of the bellows about the external surface to the first open end of the male bayonet.

The invention also comprises a second pipe spool having an outer pipe and a concentric inner pipe to couple with the first pipe spool to carry cryogenic fluid in the coupled inner pipe and to form a coupled, vacuum-insulated connection, the female bayonet having an internal, female sealing surface and a first open end and other, end arranged and constructed to form a telescoped, zero tolerance, cryogenic vapor seal between the external surface of the male bayonet and the internal surface of the female bayonet for the stress movement of the bellows in the coupled use position; and a means to connect the opposing ends of the outer pipe of the first pipe spool and the second pipe spool.

The invention will be described for the purpose of illustration only in connection with certain illustrated embodiments; however, it is recognized that various changes, modifications, additions, and improvements may be made by those persons skilled in the art of the invention, as described and disclosed, without departing from the spirit and scope of the invention.

DESCRIPTION OF THE EMBODIMENTS

Figure 1A:
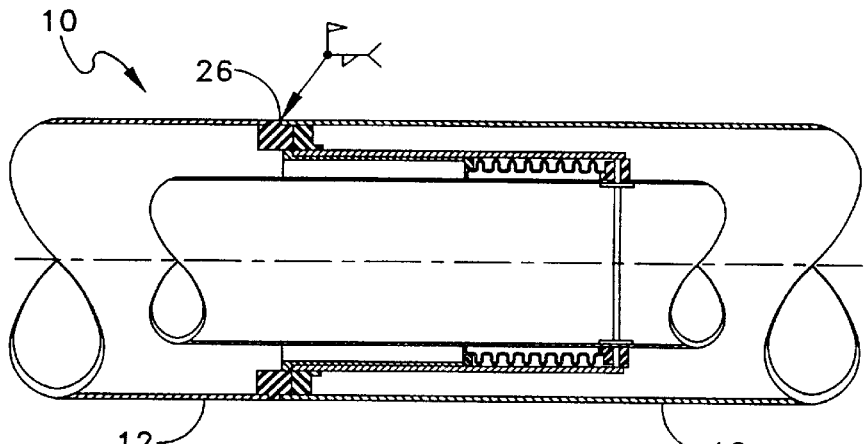
FIGS. 1A, B, and C are schematic sectional views of three types of assembled bayonet connectors of the invention.
Figure 1B:
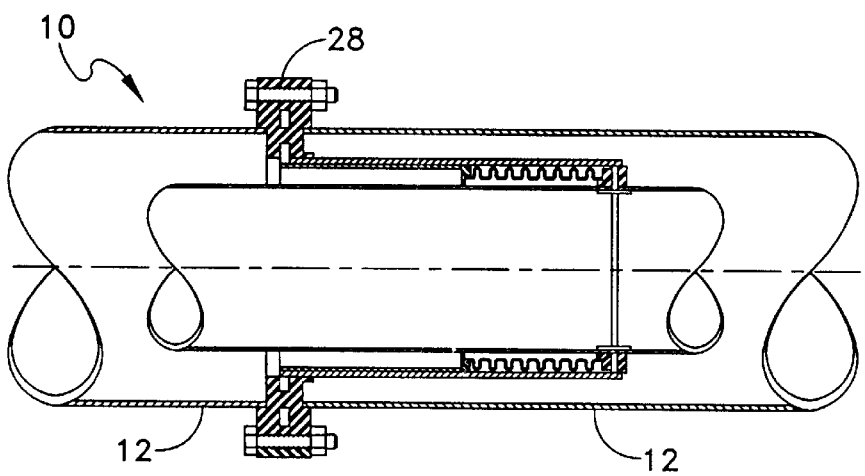
Figure 1C:
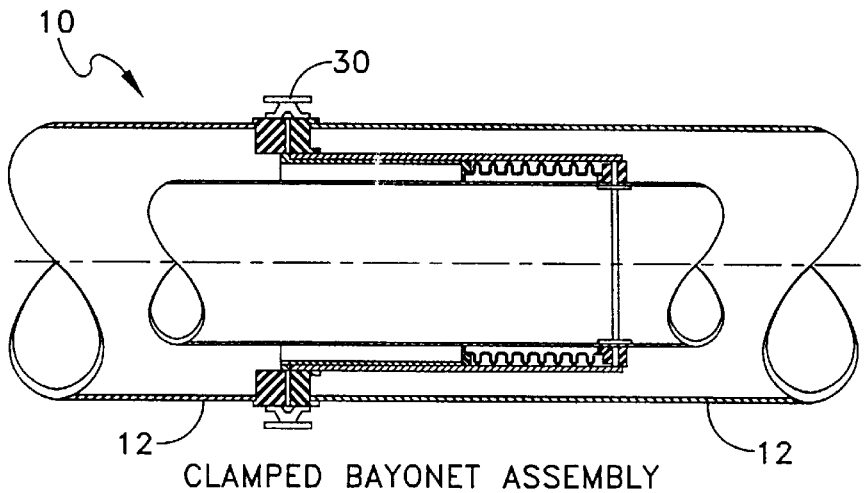

FIG. 1 shows three sectional views, A, B, and C, of coupled, cryogenic, pipe spool connectors together to form a coupled, pipe spool system 10 comprised of mating ends of separate pipe spools 12. FIG. 1 illustrates various means to connect the ends of engaged, male-female pipe spools 12 to include, but not be limited to: FIG. 1A, a welded bayonet assembly 26 wherein the pipe spools 12 have mating standoff ring closures at each open end with a butt weld construction. FIG. 1B illustrates a flanged bayonet assembly 28 of a standoff ring closure at each pipe spool 12 and with a bolt or thread flange connection 28. FIG. 1C illustrates a clamped bayonet assembly 30 for the coupled pipe spools 12 with a standoff ring closure with a ring clamp as the connector.

Figure 2:
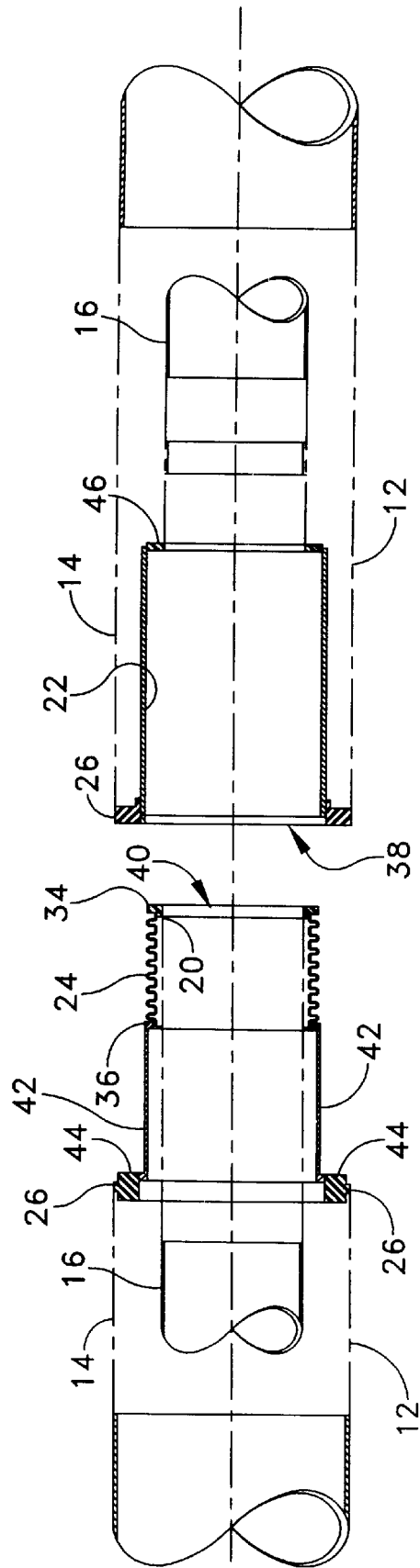
FIG. 2 is an exploded, sectional assembly view of one embodiment of the connector of FIG. 1A.
Figure 3:
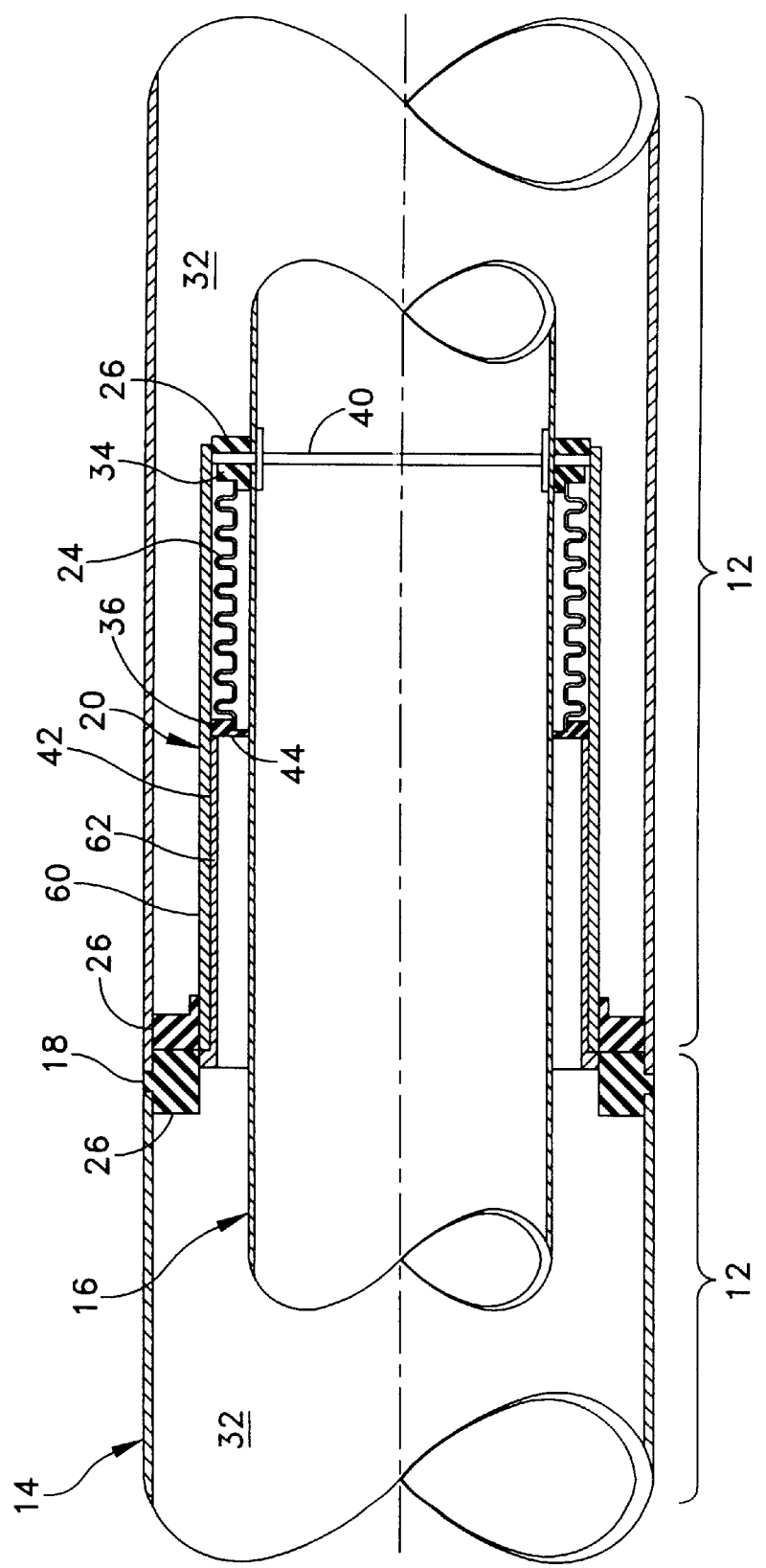
FIG. 3. is an enlarged, detailed sectional view of the assembled connector of FIG. 1A.

With reference to FIGS. 2 and 3, there are shown two aligned, opposing, end pipe spools 12 with an outer pipe 14 and an inner pipe 16, with a male bayonet 20 and a female bayonet 22, with an end of defined depth 46, and with an internal sealing surface 60. The male bayonet 20 includes a peripheral, metal, expansion-contraction bellows 24 secured at the one, outer step-down end of the open, male, inner pipe section 40 with flange 34. A concentric pipe 42, which forms the external, male, sealing-mating surface 62 of the male bayonet 20, with an inner flange 44 secured along a selected length of the male bayonet 20 and upstream of the bellows 24. The inner end of the bellows 24 is secured to the inner bellows flange 36 of the step-up concentric pipe 42.

FIGS. 2 and 3 illustrate the welded bayonet connection means with butt weldable flanges at the open end of the female bayonet 22 and at the inner end of the concentric pipe 42, with a butt flange 44 at the end of the pipe. The inner pipe 16 and outer pipe 14 in the coupled position form a jacket vacuum 32 between the coupled pipe spools 12. The bellows 24 forms a bellows space forward of the male bayonet, external mating surface 62. FIG. 3 shows the coupled pipe spools 12 in an overlapping, butt weld connection 26 in the use position (see FIG. 1A also). At all times, an overlapping connection is required to assure a zero tolerance fit between sealing surfaces 60 and 62.

Figure 4:
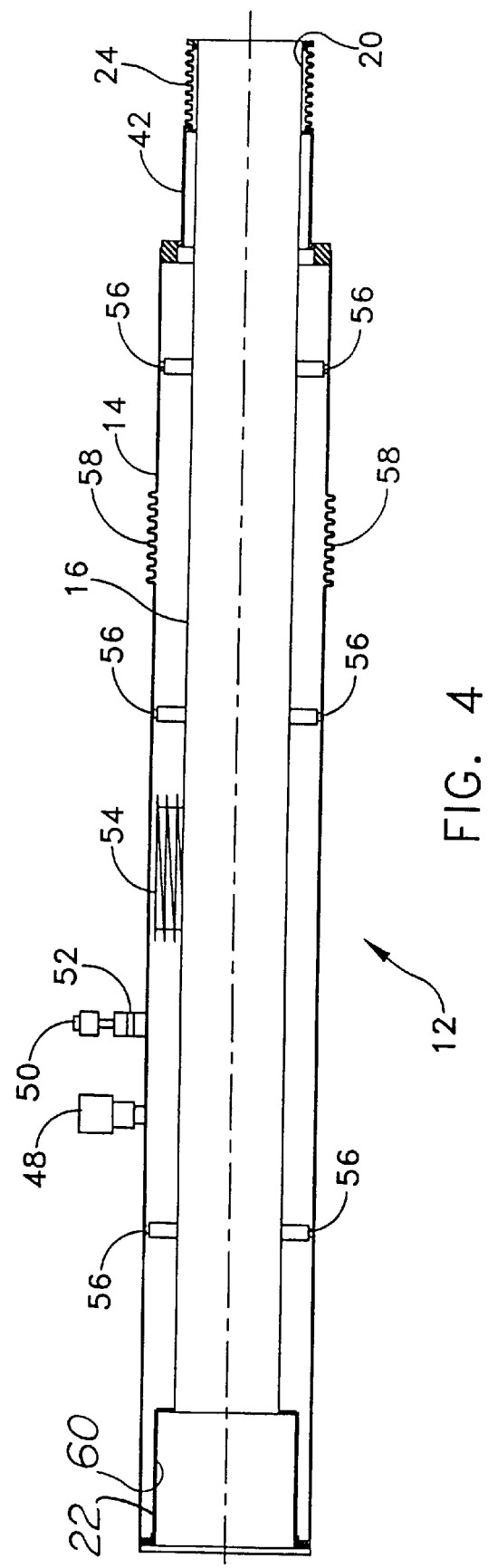
FIG. 4 is a schematic sectional view of a pipe spool of the invention.

FIG. 4 is a schematic illustrative view of a single pipe spool 12 of the invention and is used in connection with the coupled, aligned pipe spools 12 to form the cryogenic, coupled pipe spool system 10. The pipe spool 12 includes a pump-out valve or port 48 to achieve vacuum insulation after coupling, a thermocouple gauge tube 50 to read the vacuum level of each pipe spool 12, and an isolation valve 52. The pipe spool 12 includes, preferably, insulation 54 about the inner pipe 16. Low conductive pipe spacers 56 are positioned longitudinally along the vacuum space 32. The pipe spool 12 includes an external, expansion-contraction metal bellows 58 in the outer pipe 14.

With further reference to the drawings, a vacuum-jacketed inner pipe 16 with a male bayonet 20 is shown that incorporates a bellows 24 in the nose of the bayonet, of pipe sizes ranging from about ½ inch to 48 inches in diameter plus. This design allows thermal contraction or expansion of the inner pipe 16 based on the cryogenic fluid temperature, without imposing stresses on the piping system, and eliminates the need to incorporate large expansion loops in long runs of cryogenic fluid piping.

With a bellows 24 in the nose of the male bayonet 20, it will be under external pressure when the internal pipe 16 is pressurized, and the bellows 24 can operate at a higher pressure than it could if was under internal pressure when the bellows 24 is on the female bayonet 22. The bellows 24 is captured between the outside of the inner pipe 16 and the inside of the outer pipe 14 with the female bayonet 22, which will guide the bellows 24 and eliminate the possibility of squirm or undesired movement. Each vacuum-insulated section of pipe spool 12 will be supplied with a bellows 24 in the male bayonet 20 and a female bayonet 22 at the opposite end. When connected in the field with other vacuum-insulated pipe spools 12, the thermal stress will be no greater than that contained within each pipe spool 12. This will eliminate the requirement for a finite element analysis on the piping system. Incorporating the bellows 24 in the male bayonet 20, with external pressure on the bellows 24 is important, since it will compress the bellows 24. when the inner pipe 16 is cooled with cryogenic fluid, which causes the inner pipe 16 to contract. The location of the bellows 24 on the outside surface of the male bayonet 20 will maintain the inner pipe 16 smooth, which reduces the pressure or friction losses in the pipe when transferring fluids. This design eliminates the requirement for expansion loops, further reducing the fluid flow friction and the amount of pipe and fitting required. Incorporating the bellows 24 in the male bayonet 20 allows for easy cleaning of the inner pipe 16 and bellows 24 before field assembly. Incorporating the bellows 24 in the male bayonet 20 eliminates collecting dirt or other particles in the convolutions of the bellows 24 that could be hazardous or cause bellows 24 damage during thermal cycling.

While the male-female pipe spool 12 design is shown in straight line form, it is recognized, and in fact preferred, that the male-female pipe spool 12 be in a slight frusto-conical form, with tapered contacting surfaces of, for example, about 0 to 15 degrees.

Each fabricated pipe spool 12 will have a male bayonet 20 with bellows 24 at one end, and the other end can have a female bayonet 22; male bayonet 20 without bellows 24; standoff ring closure with a fillet, groove, or butt weld connection 26; or standoff ring closure with flange connection 28. The pipe spool 12 end connection opposite the male bayonet 20 with the bellows 24 can have a bend in the end just prior to the fixed male or female bayonet 20 or 22, without adding additional flexibility or bellows 24 to the pipe.

Pipe spool assemblies can run long distances in one direction and will permit you to change direction up to 90 degrees in another direction, without concern for thermal stresses building up in the piping.

The male and female bayonets 20 and 22 are designed to mate with a high tolerance fit when connected. The male and female bayonets 20 and 22 may also be tapered by the same angle of taper and connected together with a near zero tolerance fit when connected.

The shop-fabricated pipe spools 12 will be delivered to the field with a permanent static vacuum and connected by flanged joints 28, clamped joints 30, or welded joints 26. Elastomeric "O-rings" will be required for the flanged and clamped joints 28 and 30 to achieve the pressure seal for the cryogenic fluid. The welded joint 26 will not require "O-rings"; welding will seal the piping.

The inner pipe 16 material should be stainless steel or another compatible material with cryogenic fluid, and the outer pipe 14 will be designed for the atmospheric environment where it will be installed. This material can be stainless steel or carbon steel with a proper outer coating to eliminate or reduce corrosion or aluminum.

This piping design can be used underground, aboveground, and underwater for the transport of cryogenic fluids. The outer pipe 14 design can be modified to meet the pressure and environmental requirements of being placed underground or underwater.

The pipe spool system may be used in both underground vacuum-insulated pipe (VIP) and underwater vacuum-insulated pipe (VIP) for annular space relief device manifolding. In an underground VIP system, the pump-out valve relief device can be manifolded to collect all vent gases in a vent header and vent all flammable or hazardous gases in a safe area away from the pipe spool relief device. In an underwater VIP system, the vent piping outlet is above the water line to prevent water from entering into the annular space during venting or relieving of gas from the annular space between the inner and outer pipe.

When the pipe is placed underground, a vertically-oriented open pipe will be located above each pump-out valve 48 location and will be capped above grade to provide access for evacuation and monitoring. Vacuum-insulated piping installed underwater will be maintained in position with ballast anchors around the pipe to secure the pipe to the seabed. Pump out ports 48 will be sealed with a cover of seawater-compatible material and act as a rupture disc, if the pump-out valve 48 relief device is activated. The relief device will also incorporate a check valve that will close when the relieving is stopped, to prevent seawater from entering the annular space. The underwater piping may also be provided with a vertically-oriented tube centered over the pump-out valve 48, which is seal-welded to the pipe and extends above the water at high tide, and that is capped to prevent seawater from entering into the vertical tube.

The male bayonet 20 is provided with a flange that is welded to the outer pipe 14. The outer end of the male bayonet 20 has a flange which is welded to the male bayonet 20 and has a clearance fit of approximately 0.062 inches around the outside of the inner pipe 16. One end of the bellows 24 is welded to an end flange which is also welded to the inner pipe 16. The end flange is larger in diameter than the bellows 24 to protect the bellows 24 from damage during handling and installation into the female bayonet 22. The outside diameter of the end flange is rounded or tapered to help guide and align the male bayonet 20 into the female bayonet 22.

The female bayonet 22 length is extended to allow space for the bellows 24 that is attached to the end of the male bayonet 20. This length will act as a guide to the bellows 24 and keep the bellows 24 from squirming, due to thermal expansion and contraction of the inner pipe 16.

Each factory-fabricated pipe spool having a male bayonet 20 at one end and a female bayonet 22 at the other opposite end will be insulated with multilayer insulation 54 wrapped around the inner pipe 16. A vacuum in the annular space will be achieved using the pump-out valve 48 welded to the outer pipe 14. Provisions will be provided to read the vacuum level of each pipe spool 12 by a thermocouple gauge tube 50 that can be isolated from the vacuum space 32 by a valve 52. The inner pipe 16 is supported along the length by low thermal conductive pipe spacers 56. These pipe spacers 56 are attached to the inner pipe 16 and extended to the inside diameter of the outer pipe 14. The pipe spacers 56 slide or roll along the outer pipe 14.

An outer pipe bellows 58, typically, needs to be added to one of the pipe spools 12 of the coupled system between two fixed supports. This outer pipe bellows 58 allows the outer pipe 14 to shrink and expand under environmental temperature changes, i.e., from summer to winter conditions and daytime to nighttime conditions. The outer pipe bellows 58 will also allow the outer pipe 14 to shrink upon the loss of vacuum of any pipe spool 12 between the fixed support points. Pipe spacers 56, located on either side of the outer pipe bellows 58, maintain axial alignment of the bellows 58. Standard pipe supports allow the outer pipe 14 to move axially.

Large bore, vacuum-insulated piping running long distances aboveground could be equipped with a monorail system integrated to the outer pipe 14. Service carts, manned access carts, and unmanned diagnostic carts would run on the monorail system for service and maintenance of these pipes. These carts are powered using natural gas, internal combustion engines. The engine operates a generator that powers electric driver motors, which are attached to wheels mounted to the monorail. The primary purpose of the access carts and service carts is to monitor the vacuum level in each pipe spool 12, repair the leak, and re-evacuate the vacuum space 32. This is accomplished by using an infrared temperature sensor focused on the outer pipe 14 and recording the temperature of each pipe spool 12, as the manned or unmanned access carts are driven by the pipe spool 12. A large variation in temperature from one pipe spool 12 to another will indicate a leak in the annular space. All necessary equipment to repair the leak will be located the service cart. This equipment consists of: spare parts; methane detector; vacuum pump; helium mass spectrometer leak detection equipment; welding equipment; an electric generator; LNG fuel tanks; communication and instrumentation equipment; a video camera; and a fold-up access platform attached to the service and access cart.

Each pipe spool 12 will be numbered with numbers that are visible to the video camera and that can be transmitted via closed circuit television to a base office, to give the location of the unmanned or manned access carts. The outer pipe 14 temperature will also be transmitted to the base office for evaluation.

Access and service carts riding on the monorail eliminate the requirement for a service road to run parallel with the pipe, thereby further reducing the installed cost of the pipe and reducing the environmental impact in remote areas.

The invention provides for and permits transport of LNG and other cryogenic fluids long distances, with minimum refrigeration losses and low thermal stresses.

What is claimed is:

1. A cryogenic fluid piping system which comprises a plurality of two or more coupled first and second pipe spools:

a) The first pipe spool having an outer pipe and a concentric inner pipe to carry cryogenic fluid,
      the outer pipe and inner pipe forming a vacuum-insulated connection, and
      a male bayonet at the one end of the first pipe spool having an external male sealing surface, and having a first open end and other end, and
      an expansion contraction peripheral bellows longitudinally about the external surface of the male bayonet adjacent the first open end, wherein the external male sealing surface of the male bayonet is a concentric pipe with an inner flange located upstream of the expansion-contraction peripheral bellows;

and means to secure the one end of the bellows about the external surface to the first open end of the male bayonet;

b) the second pipe spool having an outer pipe and concentric inner pipe to couple with the first pipe spool to carry cryogenic fluid in the coupled inner pipe and to form a coupled, vacuum-insulated connection, a female bayonet having an internal, female sealing surface and a first open end and other end arranged and constructed to form a telescoped, zero tolerance, cryogenic vapor seal between the external surface of the male bayonet and the internal surface of the female bayonet for the stress movement of the bellows in the coupled use position; and c) a means to connect the opposing ends of the outer pipe of the first pipe spool and the second pipe spool.

2. The system of claim 1 which comprises a plurality of coupled, aligned pipe spools without expansion loops.

3. The system of claim 1 wherein the first pipe spool, or second pipe spool, or both comprise a male bayonet and bellows at one end and a female bayonet at the other opposite end.

4. The system of claim 1 wherein the external-internal mating surfaces of the male bayonet and the female bayonet are frusto-conical in shape.

5. The system of claim 1 wherein the means to connect the first and second outer pipes is selected from the group consisting of: a butt weld; a flange; a clamp; and combinations thereof.

6. The system of claim 1 which includes an expansion-contraction external bellows in the first or second outer pipes, or both.

7. The system of claim 6 wherein the expansion-contraction bellows in the first or second outer pipes is between the male bayonet and female bayonet.

8. The system of claim 1 wherein the means to secure the first pipe spool comprises an outer flange at the one open end of the male bayonet and the inner flange longitudinally spaced apart from the outer flange to form a bellows space for the bellows, the one and other end of the bellows secured to the flanges.

9. The system of claim 8 wherein when the male bayonet and female bayonet are sealed the outer flange of the male bayonet is spaced from the internal surface of the female bayonet causing the bellows to be under external pressure when the inner pipes of the first and second pipe spools are pressurized.

10. The system of claim 9 wherein the second flange is spaced from the concentric inner pipe of the first pipe spool.

11. The system of claim 1 wherein the first or second pipe spool include a pump-out valve and a means to monitor the vacuum between the outer and inner pipes.

12. A cryogenic fluid piping system which comprises a plurality of two or more coupled first and second pipe spools:

a) The first pipe spool having an outer pipe and a concentric inner pipe to carry cryogenic fluid, the outer pipe and inner pipe forming a vacuum-insulated connection, and a male bayonet at the one end of the first pipe spool having an external male sealing surface, and having a first open end and other end, and an expansion contraction peripheral bellows longitudinally about the external surface of the male bayonet adjacent the first open end, wherein the external male sealing surface of the male bayonet is a concentric pipe located upstream of the expansion-contraction peripheral bellows;

and means to secure the one end of the bellows about the external surface to the first open end of the male bayonet;

b) the second pipe spool having an outer pipe and concentric inner pipe to couple with the first pipe spool to carry cryogenic fluid in the coupled inner pipe and to form a coupled, vacuum-insulated connection;

the female bayonet having an internal, female sealing surface wherein the internal female sealing surface is a section of a concentric pipe located upstream of the expansion-contraction peripheral bellows and a first open end and other end arranged and constructed to form a telescoped, zero tolerance, cryogenic vapor seal between the external surface of the male bayonet and the internal surface of the female bayonet for the stress movement of the bellows in the coupled use position; and c) a means to connect the opposing ends of the outer pipe of the first pipe spool and the second pipe spool.

\* \* \* \* \*